(12) United States Patent
Myers

(10) Patent No.: US 10,302,480 B2
(45) Date of Patent: May 28, 2019

(54) SYSTEM AND METHOD FOR CONFIGURING A MODULAR FLOATATION DEVICE TO ADAPT WITH VARIOUS BUOYANCIES

(71) Applicant: David Rocky Myers, League, TX (US)

(72) Inventor: David Rocky Myers, League, TX (US)

( * ) Notice: Subject to any disclaimer, the term of this patent is extended or adjusted under 35 U.S.C. 154(b) by 434 days.

(21) Appl. No.: 14/226,837

(22) Filed: Mar. 27, 2014

(65) Prior Publication Data

US 2015/0276465 A1 Oct. 1, 2015

(51) Int. Cl.
*G01F 23/72* (2006.01)

(52) U.S. Cl.
CPC .................. *G01F 23/72* (2013.01)

(58) Field of Classification Search
CPC .......... G01F 23/72; G01F 23/30–23/76; G01F 23/303–23/706
USPC ................. 73/305–322.5
See application file for complete search history.

(56) References Cited

U.S. PATENT DOCUMENTS

| | | | | |
|---|---|---|---|---|
| 3,638,492 A * | 2/1972 | Fling | ....................... | G01F 23/66 73/314 |
| 3,710,612 A * | 1/1973 | Innes | .................... | F22B 37/425 340/515 |
| 4,368,640 A * | 1/1983 | Tokarz | .................... | G01F 23/18 73/296 |
| 4,425,796 A * | 1/1984 | Boucher | ................. | G01F 23/76 346/72 |
| 4,976,146 A * | 12/1990 | Senghaas | ................ | G01F 23/74 200/84 C |
| 5,950,487 A * | 9/1999 | Maresca, Jr. | ......... | G01F 23/686 250/577 |
| 6,269,695 B1 * | 8/2001 | Cesternino | ............. | H01C 10/38 338/33 |
| 7,059,342 B2 * | 6/2006 | Crimmins | ............... | F16K 31/18 137/426 |
| 8,763,455 B1 * | 7/2014 | Chang | ..................... | G01F 23/72 73/304 R |
| 8,878,682 B2 * | 11/2014 | Kenney | ................... | G01F 23/68 340/623 |
| 2005/0109105 A1 * | 5/2005 | Kowalski | ................ | G01F 23/74 73/313 |

(Continued)

FOREIGN PATENT DOCUMENTS

WO 2005/093772 * 10/2005

*Primary Examiner* — Robert R Raevis
(74) *Attorney, Agent, or Firm* — Spradley PLLC; Michael Spradley

(57) ABSTRACT

A system and method for configuring a modular floatation device to adapt with various buoyancies is herein disclosed. In this embodiment, the system can comprise a one or more modules and a removable and reattachable buoyancy device. Each of the one or more modules can comprise a vertical shaft. Furthermore, one or more of the modules can comprise a magnetic circuit. Further, the removable and reattachable buoyancy device is attachable to the one or more modules. In another embodiment, a method for configuring a modular floatation device to adapt with various buoyancies is herein disclosed. The method can comprise connecting one or more modules together and attaching a buoyancy device to the modules. Each of the modules can comprise a vertical shaft. Furthermore, one or more of the modules can comprise a magnetic circuit.

7 Claims, 8 Drawing Sheets

(56) References Cited

U.S. PATENT DOCUMENTS

| | | | |
|---|---|---|---|
| 2005/0284220 A1* | 12/2005 | Cotton | B29C 45/14311 73/322.5 |
| 2010/0132455 A1* | 6/2010 | Boehmer | G01F 23/74 73/308 |
| 2011/0005312 A1* | 1/2011 | Hopper | G01F 23/0046 73/313 |
| 2014/0331764 A1* | 11/2014 | Beuger | G01F 23/72 73/311 |
| 2015/0011953 A1* | 1/2015 | Schmidt | A61M 1/0025 604/318 |
| 2015/0268086 A1* | 9/2015 | Chang | G01F 23/62 73/311 |

* cited by examiner

US 10,302,480 B2

SYSTEM AND METHOD FOR CONFIGURING A MODULAR FLOATATION DEVICE TO ADAPT WITH VARIOUS BUOYANCIES

BACKGROUND

This disclosure relates to a system and method for configuring a modular floatation device to adapt with various buoyancies.

For years, one of the common methods in measuring level of liquid is through a liquid level indicating gauge. This instrument utilizes a non-magnetic cylindrical tube and a magnetic floatable device that is axially movable within the cylindrical tube. Furthermore, the floatable device can be configured to rest at the surface of the liquid within the cylindrical tube. This floatable device can be magnetically coupled with an indicator that is outside said cylindrical tube. As such, the indicator is enclosed within a measuring instrument. Therefore, as the magnetic floatable device moves up and down according to the level of fluid within the cylindrical tube, the indicator follows accordingly indicating the level of the surface of liquid. In such setup, floatable devices are individually designed in accordance to the type of fluid in which it will be used. As such, a floatable device can only be used for a particular liquid in which it was designed for. This type of arrangement has worked over the years. However, having a floatable device that is only designed for a certain type of liquid can be less efficient. Furthermore, floatable devices are configured to have a capsule shape wherein its outer diameter usually comes in contact with the inner diameter of the cylindrical tube. In this type of configuration, more friction is created between the floatable device and the cylindrical tube. Thus, greater force would be needed for floatable device to move within the cylindrical tube.

As such it would be useful to have a system and method for configuring a modular floatation device to adapt with various buoyancies.

SUMMARY

A system and method for configuring a modular floatation device to adapt with various buoyancies is herein disclosed. In this embodiment, the system for a float gauge can comprise a one or more modules and a removable and reattachable buoyancy device. Each of the one or more modules can comprise a vertical shaft. Furthermore, one or more of the modules can comprise a magnetic circuit. Further, the removable and reattachable buoyancy device is attachable to the one or more modules.

In another embodiment, a method for configuring a modular floatation device to adapt with various buoyancies is herein disclosed. The method for configuring the modular floatation device can comprise connecting one or more modules together and attaching a buoyancy device to the modules. Each of the modules can comprise a vertical shaft. Furthermore, one or more of the modules can comprise a magnetic circuit.

DETAILED DESCRIPTION

Described herein is a system and method for configuring a modular floatation device to adapt with various buoyancies. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
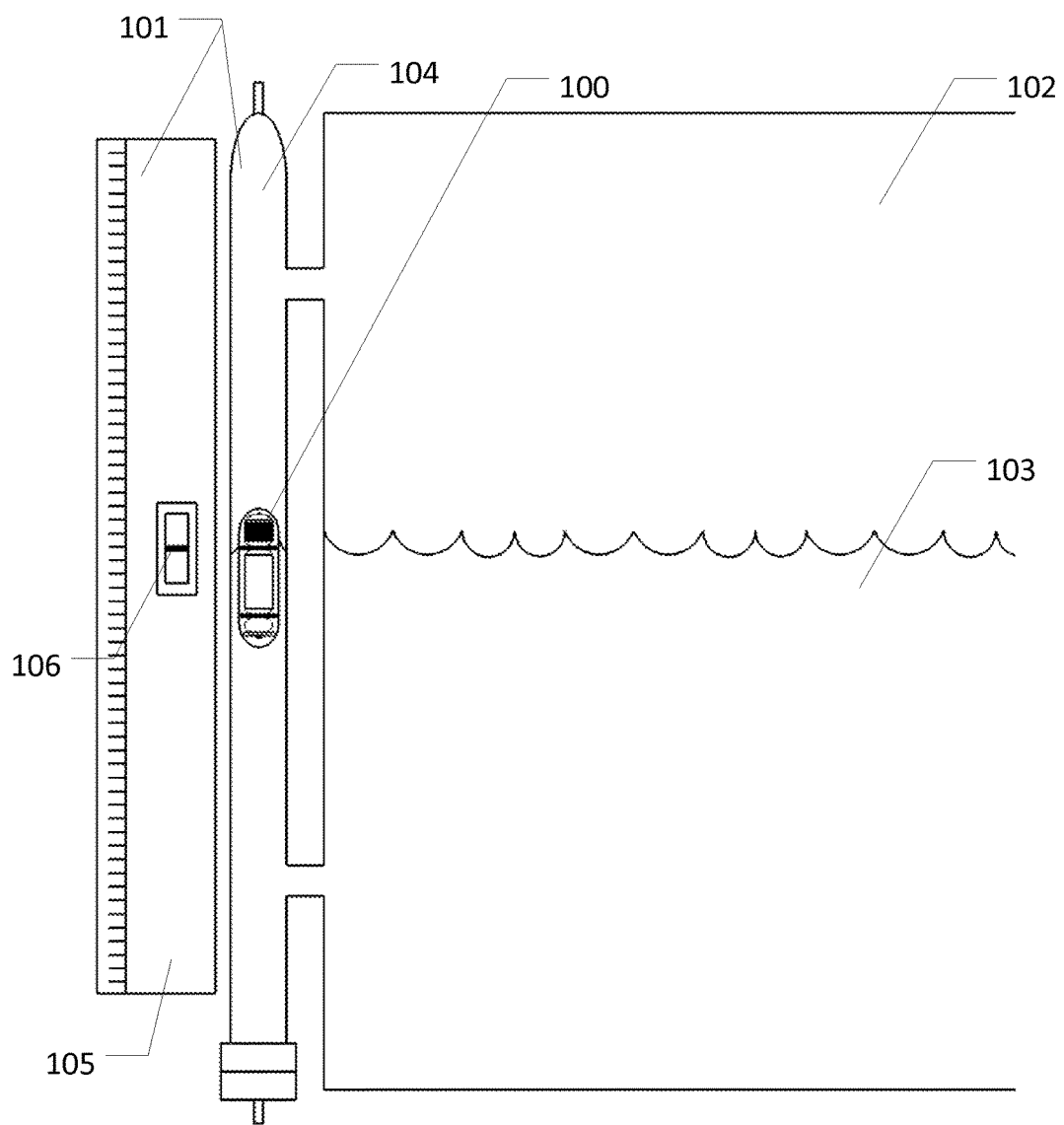
FIG. 1 illustrates a liquid level gauge connected to a container.

FIG. 1 illustrates a liquid level gauge 101 connected to a container 102. Container 102 can be an enclosed device that is used to contain liquid 103. Container 102 can include but are not limited to tanks, boilers, drums, or vessels. Liquid 103 can be any type of fluid such as oil, water, alcohols, acids, etc. Thus, each type of liquid 103 can have different properties and densities. Liquid level gauge 101 can be used to show the measure of liquid 103 that is within container 102. Liquid level gauge 101 can comprise a chamber 104 and an indication device 105. Chamber 104 can be a non-magnetic cylindrical tube part of liquid level gauge 101 that utilizes a modular floatation device 100. Floatation device 100 can comprise a powerful magnetic assembly. Moreover, floatation device 100 can be light enough to maintain buoyancy, which can allow floatation device 100 to ride freely on the surface of liquid 103. Furthermore, floatation device 100 can be configured to have different properties that can allow floatation device 100 to withstand temperature and pressure. Further, liquid level gauge 101 can be connected to container 102 such that liquid 103 in container 102 can have the same level with the liquid in chamber 104. Therefore, floatation device 100 can indicate the rise and fall of liquid level within container 102 and chamber 104. Indication device 105 can be connected outside and in parallel with chamber 104. Indication device 105 can be an instrument such as a scale that is used to show the amount or level of liquid 103 within chamber 104. Indication device 105 can comprise an indicator 106. Indicator 106 can be magnetically coupled with floatation device 100. Thus, indicator 106 can move within indication device 105 in accordance with the rising and falling of floatation device 100 within chamber 104.

Figure 2A:
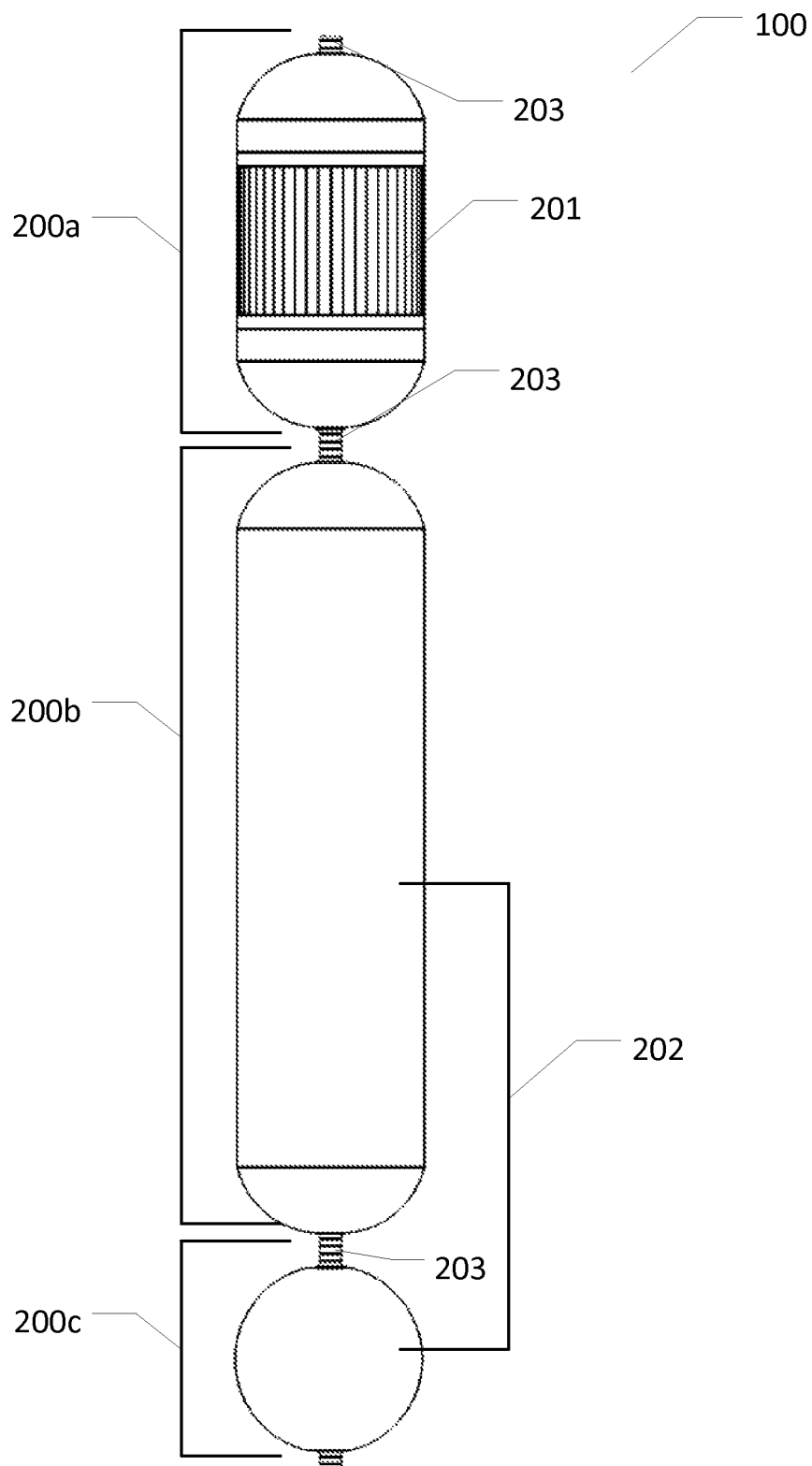
FIG. 2A illustrates an exploded view embodiment of a floatation device.

FIG. 2A illustrates an exploded view of floatation device 100. Floatation device 100 can comprise a plurality of modules 200 that can be connected and combined in different ways to achieve particular buoyancy. Each module 200 can be a single structure that makes up floatation device 100. Each module 200 can be configured in different shapes. Furthermore, modules 200 can comprise of durable material that includes but are not limited to stainless steel, titanium, hastelloy, or Teflon-coated. In one embodiment, top section and bottom section of modules 200 can each comprise a vertical shaft 203. Vertical shaft 203 can be the connectable portion of each module 200. As such, vertical shaft 203 can be mateable to a compatible device. In one embodiment, vertical shaft 203 can be permanently connected to modules 200. In such embodiment, vertical shaft 203 can be affixed with modules 200 through cementing, molding or through the use of any adhesive materials. In another embodiment, vertical shaft 203 can be attachable and detachable from modules 200. In such embodiment vertical shaft 203 can be connected to modules 200 through the use of fastener.

In this embodiment, modules 200 can comprise a magnetic circuit 201, and at least one or more buoyancy compensation devices 202. Magnetic circuit 201 can be a cylindrical enclosure that comprises a 360-degree magnetic ring that surrounds first module 200a. Thus, magnetic circuit 201 can channel magnetic fields to indicator 106. As such, magnetic circuit 201 can be the portion of floatation device 100 that rests at the surface of liquid 103. Buoyancy devices 202 can be an instrument used to stabilize or establish a particular buoyancy of floatation device 100 in liquid 103. Furthermore, buoyancy devices 202 can be removable and attachable to one or more modules 200.

Figure 2B:
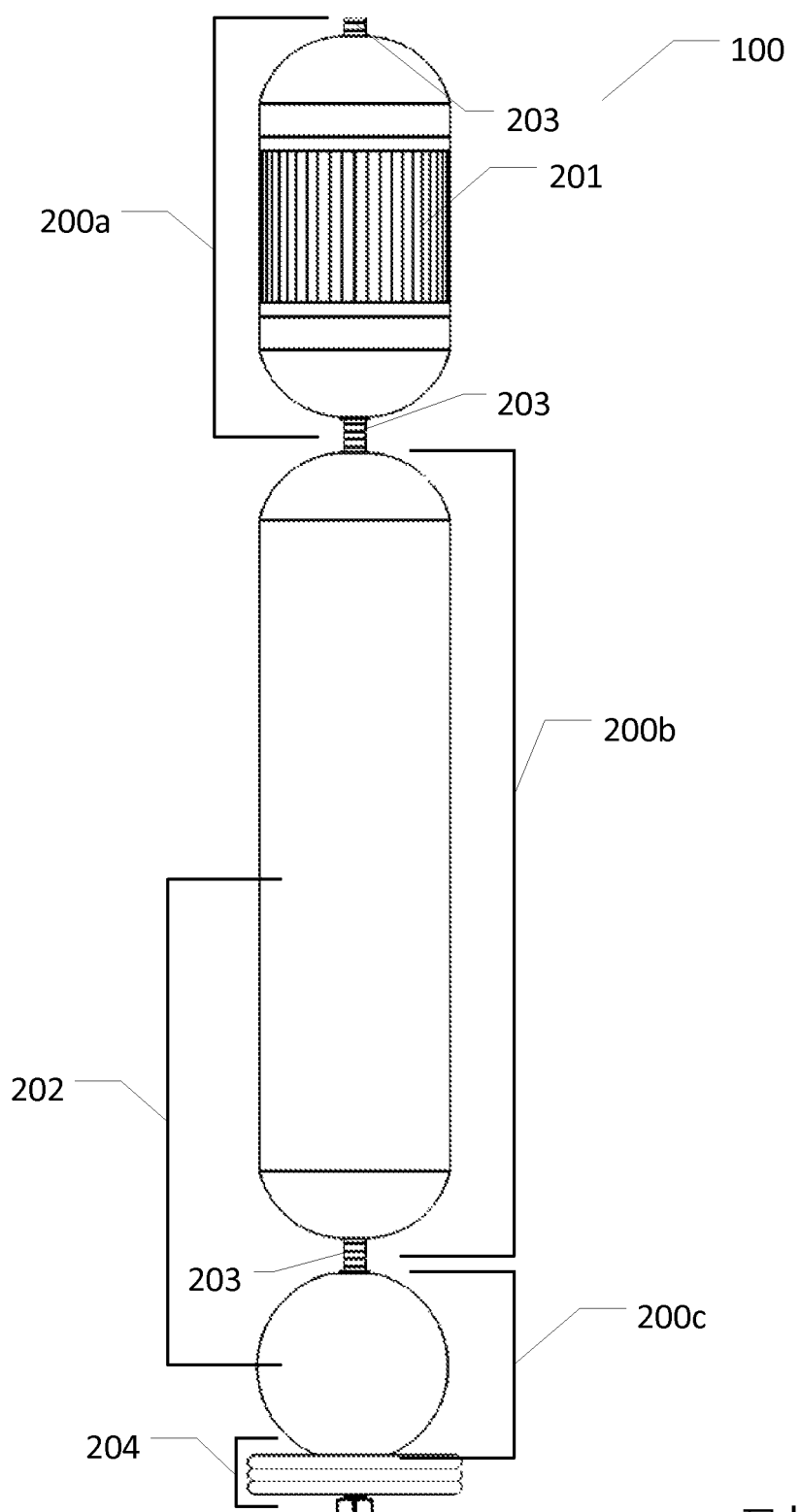
FIG. 2B illustrates a floatation device further comprising buoyancy device wherein said buoyancy device is one or more weight washers.

FIG. 2B illustrates floatation device 100 further comprising buoyancy device 202 wherein said buoyancy device is one or more weight washers 204. Weight washers 204 can be a thin plate material configured to provide additional overall density to floatation device 100. As such, weight washers 204 can either be added or removed from the bottom of floatation device 100 to achieve a particular buoyancy. Additionally each weight washer 204 can be the same density and mass, or can vary in density and/or mass. In one embodiment, floatation device can arrive to a consumer as a kit that comprises multiple buoyancy devices 202. Buoyancy devices 202 in the kit can have either a negative buoyancy effect or a positive buoyancy effect on floatation device 100, and such kit can be designed such that various combinations buoyancy devices 202 can allow floatation device to have a spectrum of different buoyancies depending on buoyancy device 202 combinations. Such kit can come with directions on which combinations can be used to create flotation device 100 with a particular buoyancy.

Figure 2C:
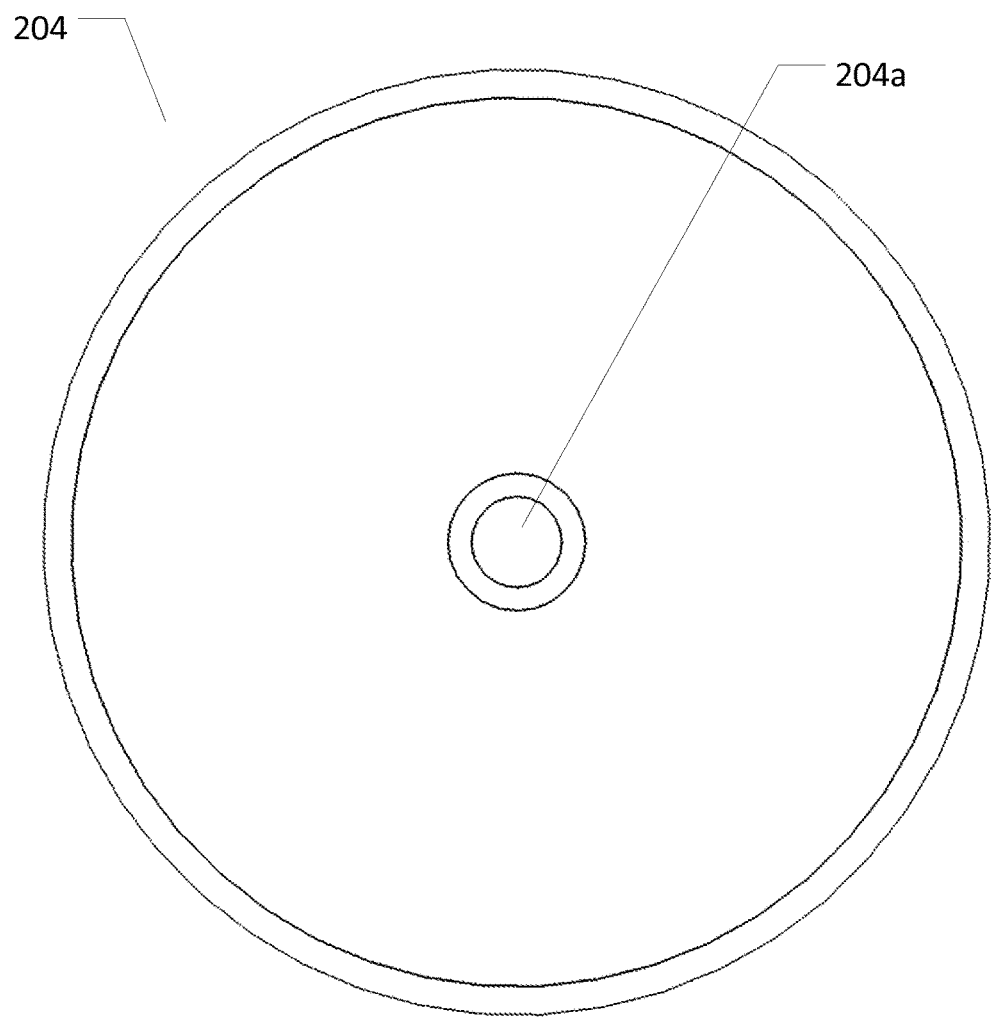
FIG. 2C illustrates a top view of weight washers.

FIG. 2C illustrates a top view of weight washers 204. Weight washers 204 can comprise an orifice 204a. Orifice 204a can allow weight washers 204 connectable with the bottom section of modules 200. In one embodiment, weight washers 204 can be fastened at the bottom of modules 200 through a fastener such as screws, nuts, and bolts.

Figure 3A:
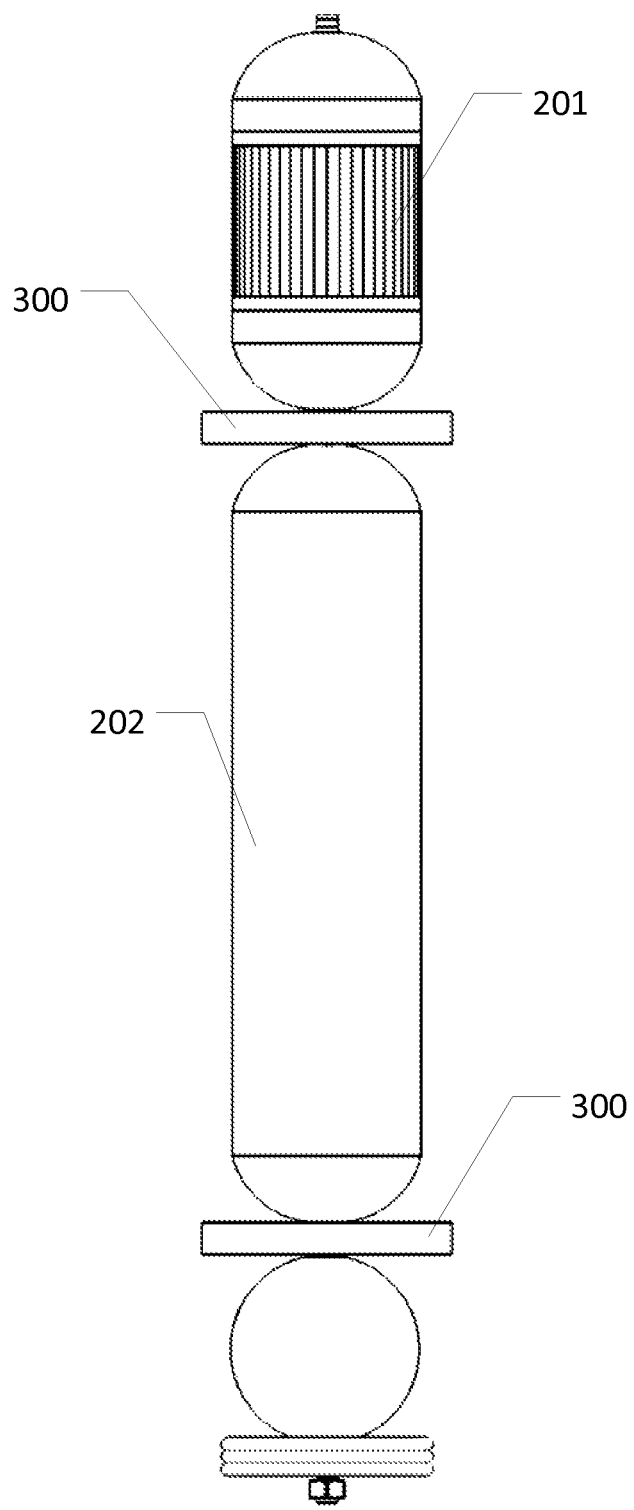
FIG. 3A illustrates a chamber ring attached between each module.

FIG. 3A illustrates a chamber ring 301 attached between each module 200. Chamber ring 300 can be a circular material attached in between modules 200. Chamber ring 300 can have a diameter that is larger than modules 200. This configuration can allow floatation device 100 to minimize the surface area that comes in contact between the inner surface of chamber 104 and outer surface of floatation device 100.

Figure 3B:
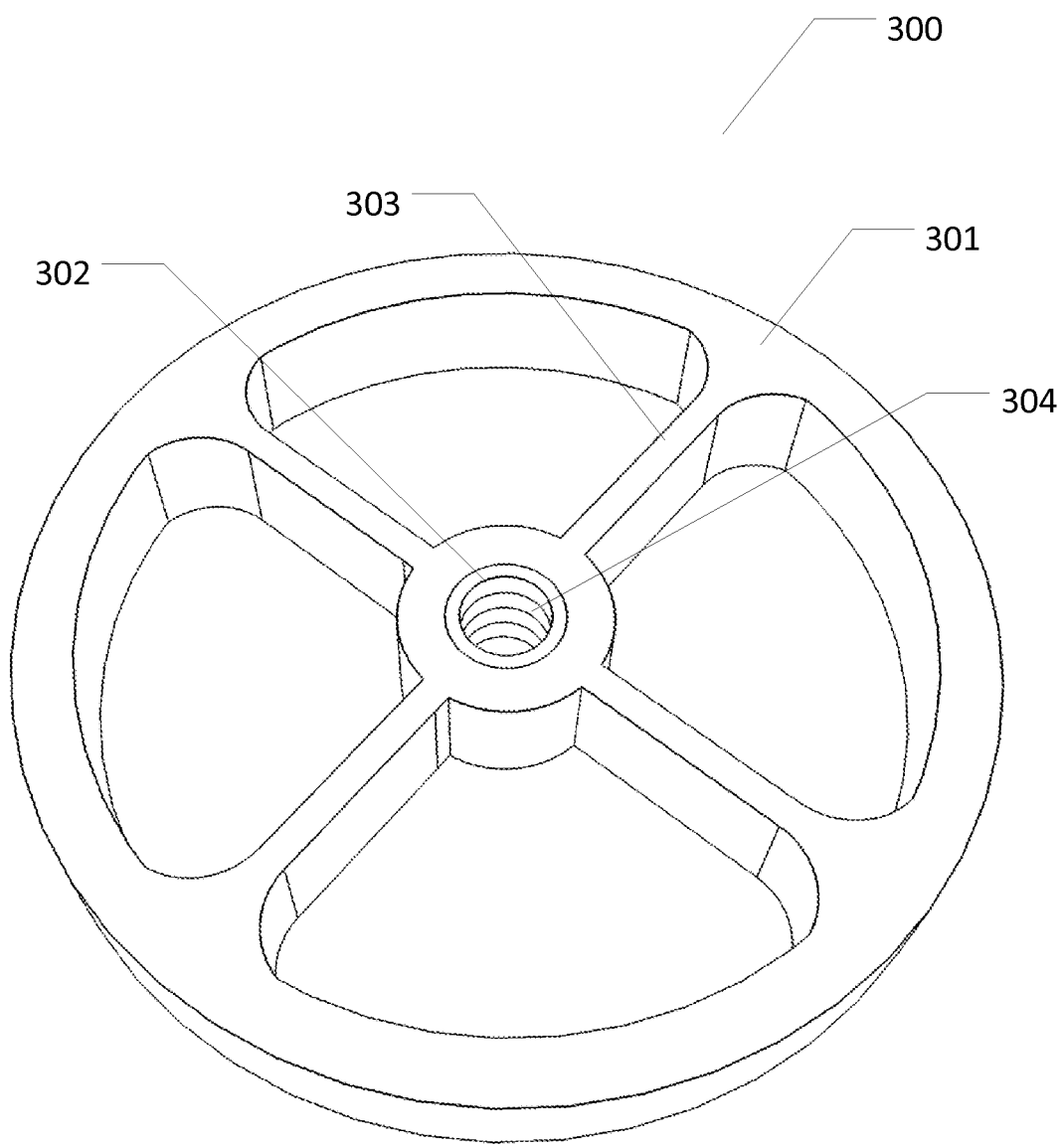
FIG. 3B illustrates a top view of chamber ring.

FIG. 3B illustrates a top view of chamber ring 300. Chamber ring 300 can comprise an outer ring 301, a center orifice 302, and a plurality of spokes 303. Outer ring 301 can be the outermost portion of chamber ring 300. Thus, outer ring 301 can be the part of chamber ring 300 that comes in contact with the inner surface of chamber 104. Center orifice 302 can be the hole positioned at the center of chamber ring 300. Spokes 303 can be the shafts that connect center orifice 302 with outer ring 301. As such creating a plurality of perforations 305 at the middle of chamber ring 300. Further in one embodiment, the inner diameter of center orifice 302 can have a threaded portion 304. In such embodiment chamber ring 300 can be used to connect modules 200 together.

Figure 3C:
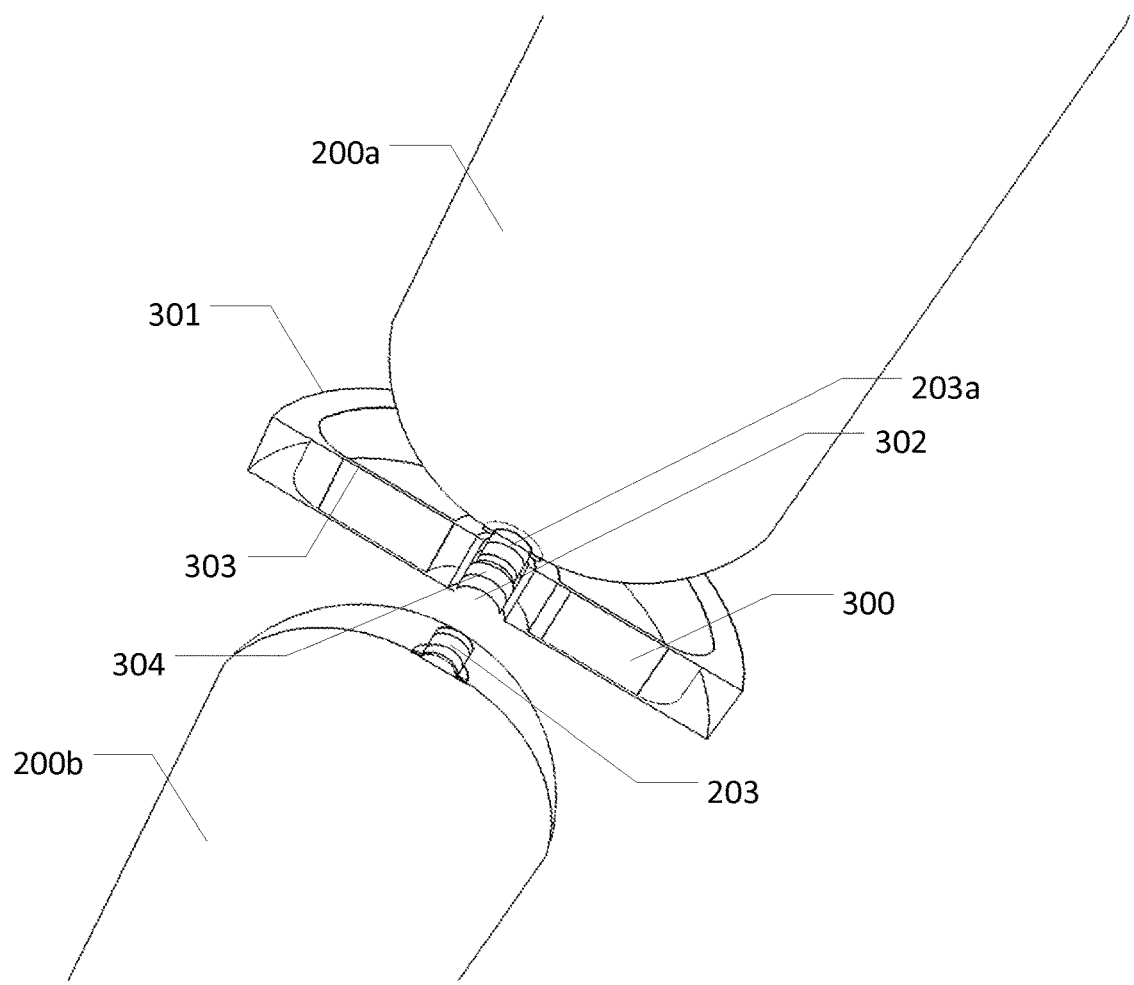
FIG. 3C illustrates a sectional view of chamber ring connected to modules.

FIG. 3C illustrates a sectional view of chamber ring 300 connected to modules 200. In this embodiment, chamber ring 300 can be used to attach each module 200. In one embodiment, chamber ring 300 can comprise threaded portion 304. As such, vertical shaft 203 of module 200 can comprise a helical ridge 305 that can be mateable with threaded portion 304 of center orifice 302. In another embodiment, outer diameter of vertical shaft 203 can be configured to fit snugly within the inner diameter of center orifice 302. In this embodiment, vertical shafts 203 of each module 200 can be insertable within center orifice 302. Further in another embodiment, each module 200 can be permanently attached together through methods such as cementing, soldering, or through the use of any adhesive materials.

Figure 4:
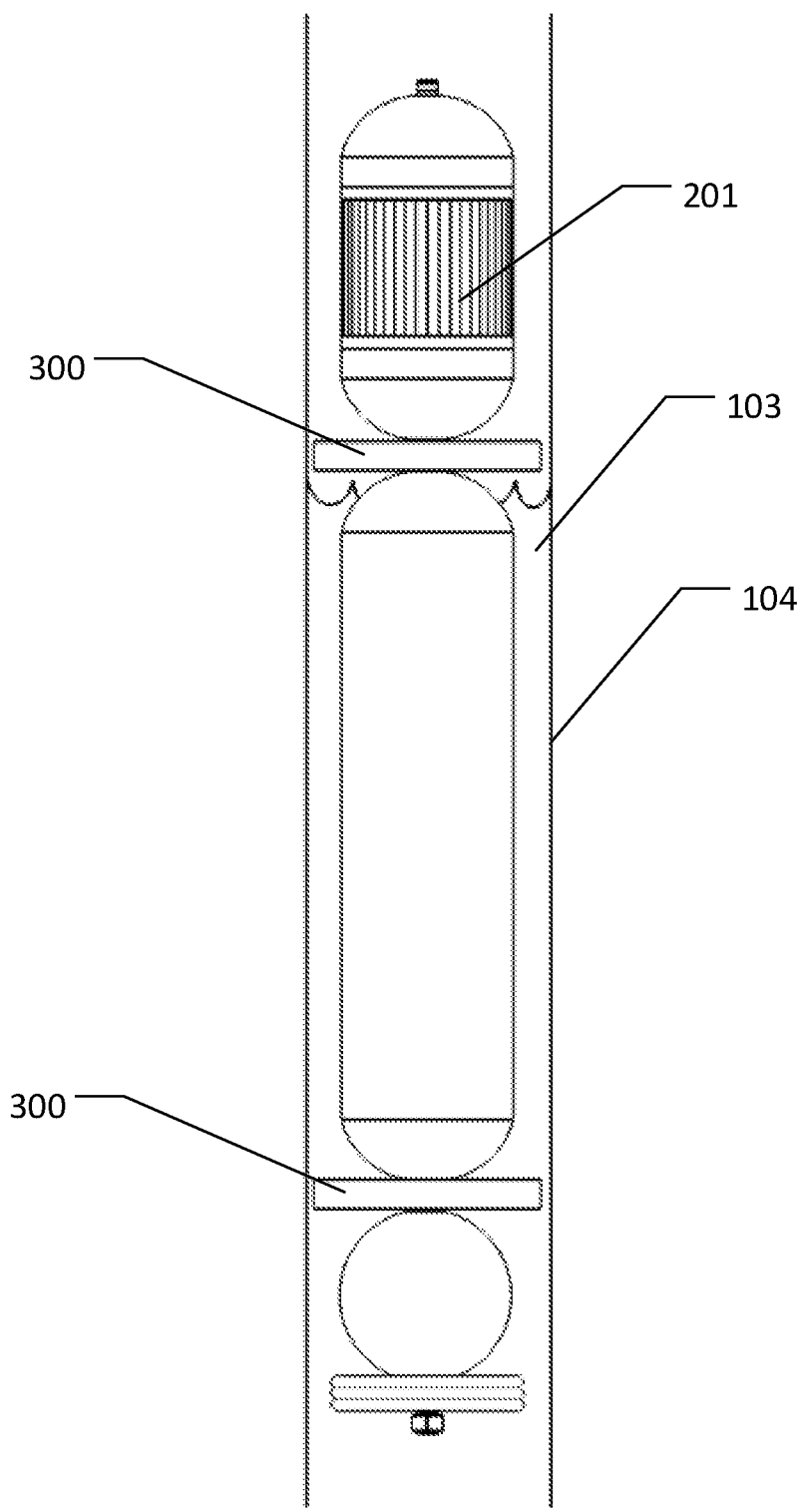
FIG. 4 illustrates an exploded view of a floatation device within a chamber.

FIG. 4 illustrates an exploded view of floatation device 100 within chamber 104. Different process liquid 103 can be measured through liquid level gauge 101. As such floatation device 100 can be configurable to adapt to buoyancy of liquid 103. Since liquid 103 can have a particular density, buoyancy devices 202 can be connected to magnetic circuit 201 to provide the required density that can allow floatation device 100 to rest at the surface of liquid 103. In one embodiment, buoyancy device 202 can have a weight to volume ratio less than module 200 to increase buoyancy of floatation device 100. In this embodiment, increasing the buoyancy of floatation device 100 can allow floatation device 100 to rise in liquid 103. In another embodiment, buoyancy device 202 can have a weight to volume ratio greater than modules 200 to decrease buoyancy. In such embodiment, a decrease in buoyancy on floatation device 100 can allow floatation device 100 to immerse in liquid 103. Thus in such embodiments, different and multiple buoyancy devices 202 can be added, removed and/or combined to achieve proper buoyancy for particular type of liquid 103.

Furthermore, in this embodiment the diameter of chamber ring 300 can be larger than the diameter of modules 200 and weight washers 204. This configuration can reduce the surface area of floatation device 100 that touches the inner diameter of chamber 104 therefore decreasing friction, thus allowing floatation device 100 to move within chamber 104 with less resistance. In one embodiment, chamber ring 300 can be a buoyancy device 202.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A kit for making a float gauge at a spectrum of buoyancies, comprising
    a plurality of modules configured to float freely about a surface of a liquid, said plurality of modules comprising
        a first module comprising a magnetic circuit capable of magnetically coupling with an indicator to communicate a level of said liquid;
    one or more other modules connected to said first module, said one or more other modules removable and reattachable to each other and said first module, said one or more other modules from a kit of modules configured to allow a user to set a buoyancy of said plurality of modules such that said first module rests at said surface of said liquid, wherein said one or more other modules comprises a buoyancy device, further wherein said buoyancy device has a weight to volume ratio greater than said plurality of modules.

2. The kit of claim 1 wherein said buoyancy device further comprises a weight washer.

3. A kit for making a float gauge at a spectrum of buoyancies, comprising
    a plurality of modules configured to float freely about a surface of a liquid, said plurality of modules comprising
        a first module comprising a magnetic circuit capable of magnetically coupling with an indicator to communicate a level of said liquid;
    one or more other modules connected to said first module, said one or more other modules removable and reattachable to each other and said first module, said one or more other modules from a kit of modules configured to allow a user to set a buoyancy of said plurality of modules such that said first module rests at said surface of said liquid, wherein said one or more other modules comprises a buoyancy device, further wherein each of said plurality of modules comprises a center orifice, further wherein said float gauge further comprises one or more shafts, said one or more shafts linking said plurality of modules together.

4. The kit of claim 3 wherein said center orifice comprises first threads, further wherein said one or more shafts comprises second threads mateable with said first threads.

5. A method for configuring a floatation device to adapt with various buoyancies comprising the step of
    connecting together a plurality of modules together to form a float gauge, said said plurality of modules comprising
        a first module comprising a magnetic circuit;
        one or more other modules connected to said first module, said one or more other modules removable and reattachable to each other and said first module, said one or more other modules from a kit of modules configured to allow a user to set a buoyancy of said plurality of modules;
    floating freely said float gauge within a column of a liquid; and
magnetically coupling said magnetic circuit with an indicator to communicate a level of said liquid, said buoyancy of said float gauge set such that said first module rests at said surface of said liquid; and
changing said buoyancy of said float gauge by removing a module from said one or more other modules.

6. A method for configuring a floatation device to adapt with various buoyancies comprising the step of
    connecting together a plurality of modules together to form a float gauge, said plurality of modules comprising
        a first module comprising a magnetic circuit
        one or more other modules connected to said first module, said one or more other modules removable and reattachable to each other and said first module, said one or more other modules from a kit of modules configured to allow a user to set a buoyancy of said plurality of modules;
    floating freely said float gauge within a column of a liquid; and
magnetically coupling said magnetic circuit with an indicator to communicate a level of said liquid, said buoyancy of said float gauge set such that said first module rests at said surface of said liquid, and
changing said buoyancy of said float gauge by attaching an additional module to said one or more other modules, wherein said additional module has a weight to volume ratio greater than said float gauge.

7. The method of claim 6 wherein said additional module is a weight washer.

* * * * *